(No Model.)

R. M. SMITH & W. H. COLLINS.
HEATING OR COOLING PAD.

No. 301,931. Patented July 15, 1884.

Witnesses:

Inventors
Robert M. Smith
W. H. Collins

United States Patent Office.

ROBERT M. SMITH AND WILLIAM H. COLLINS, OF NAUGATUCK, CONNECTICUT, ASSIGNORS TO THE GOODYEAR INDIA RUBBER GLOVE MANUFACTURING COMPANY, OF SAME PLACE.

HEATING OR COOLING PAD.

SPECIFICATION forming part of Letters Patent No. 301,931, dated July 15, 1884.

Application filed December 21, 1883. (No model.)

*To all whom it may concern:*

Be it known that we, ROBERT M. SMITH and WILLIAM H. COLLINS, of the town of Naugatuck, in the county of New Haven and State of Connecticut, have invented a new and useful Improvement in Heating or Cooling Pads for Application to the Body of a Patient, of which the following is a specification.

Our invention relates to a pad so shaped that it may be closely applied the head or other part of the body of a patient, and so formed of a coil of rubber tubing that a constant supply of hot or cold water may keep it at an even temperature, the rubber tubes being united to form the coil by rubber cement, so as to give a continuous rubber surface to the pad.

Heretofore pads have been formed for a like purpose with rubber tubes connected together by cloth or sewed together, and in such cases it has been found that the pads could not be properly cleaned, and that infectious diseases were communicated by their use; but in our improved pad the continuous rubber surface allows it to be readily washed.

We obtain the objects of our invention by the contrivance shown in the accompanying drawings, in which—

Figure 1:
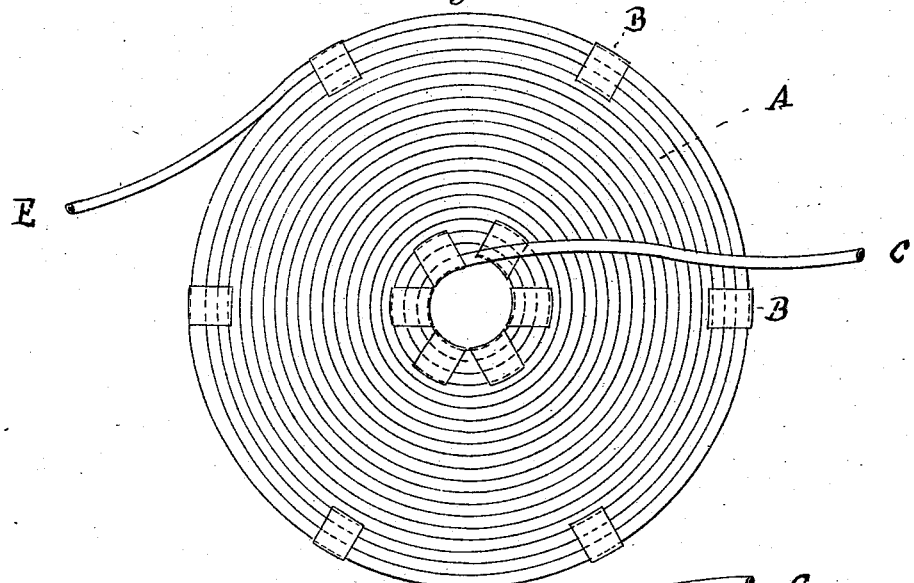
Figure 2:
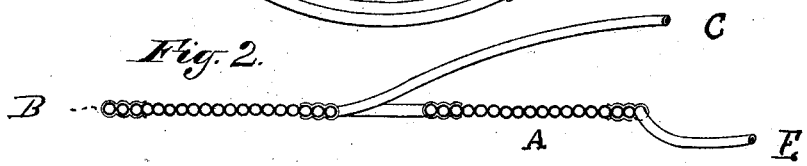

Figure 1 shows a flat pad. Fig. 2 shows a flat pad in section, and Fig. 3 a hemispherical pad for application to the head.

Similar letters refer to similar parts throughout the several views.

The pad is formed of a coil of ruber tubing, A, the contiguous parts of the coil being attached to one another by rubber cement, and in some cases also by binding-strips of rubber-coated fabric B B, especially at the inner and outer ends of the coil. This union of the parts by rubber cement gives the continuous coating already alluded to, and makes the pad more cleanable and durable, and this continuity is not disturbed when the binding-strips are used, such strips being in all cases coated with rubber. The tube extends from the inner part of the coil sufficiently to form a supply-tube, C, the end of which is connected with a vessel supplying hot water or ice-water. The outer end of the coil E is likewise entered sufficiently far to form a discharge-tube to a receiving-vessel. It is obvious, however, that this arrangement may be reversed, that the outer end of the coil may be used for the supply-pipe and the inner end for the discharge.

Figure 3:
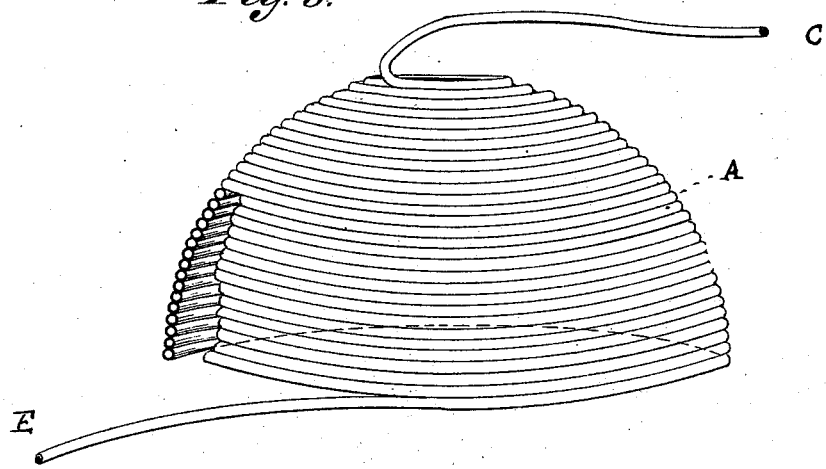

The operation of the invention is as follows: The pad A, Fig. 3, is applied to the head of the patient, or the pad, Fig. 1, to any part of the body to which it is desired to impart heat or cold. The vessel containing the ice-water or hot water is placed in an elevated position, and the supply-tube C is connected with it either by fitting the end over a suitable nozzle or in the form of a siphon. The end of the discharge-tube E is placed in the receiving-vessel. The ice-water or hot water will thus flow continuously through the tube forming the pad, and keep it at an even temperature. By this arrangement any part of the body of a patient may be kept at any desired temperature, and at the same time perfectly dry; and in case of application to parts of the body, when the skin is broken or destroyed, the pads may be cleansed as often as desired.

It is not essential that the tubing shall be in the form of a coil, so long as it forms a mat through which water will readily pass; but the form of a coil is preferable, because the water passes with less friction through its even curves than through the angles and abrupt turns of other forms of mat.

The coils may be made upon suitable forms in any desired shape, so that the mat will fit the head, throat, stomach, limbs, or other parts.

We are aware that the use of rubber tubing for cooling and heating bandages is not new, and are aware that patents have been granted for different methods of such use and for appliances in connection with such rubber tubing, as in the United States Patents to J. Leiter, No. 267,435, November 14, 1882, and to O. M.

Fuller, No. 43,679, August 2, 1864, and therefore we do not claim, broadly, the use of rubber tubing for such purpose; but

We claim as our invention and desire to secure by Letters Patent—

A heating or cooling pad consisting of a mat formed of rubber tubing whose contiguous parts are united together by rubber cement, forming, with the tubing, a continuous rubber surface that can be readily and thoroughly cleansed, and provided with the supply pipe or tube C, and the discharge pipe or tube E, substantially as and for the purpose set forth.

ROBERT M. SMITH.
W. H. COLLINS.

Witnesses:
L. M. ALLERTON,
L. M. WOODFORD.